United States Patent [19]

Sampei

[11] Patent Number: 4,899,367
[45] Date of Patent: Feb. 6, 1990

[54] MULTI-LEVEL QUADRATURE AMPLITUDE MODULATOR SYSTEM WITH FADING COMPENSATION MEANS

[75] Inventor: Seiichi Sampei, Akishima, Japan

[73] Assignee: Communications Research Laboratory Ministry of Posts and Telecommunications, Tokyo, Japan

[21] Appl. No.: 305,170

[22] Filed: Feb. 2, 1989

[30] Foreign Application Priority Data

Feb. 2, 1988 [JP] Japan .................................. 63-21203

[51] Int. Cl.⁴ .......................................... H04B 7/005
[52] U.S. Cl. ....................................... 375/39; 375/58; 375/76; 375/99; 455/63
[58] Field of Search ...................... 375/13, 39, 58, 76, 375/99, 102; 455/63, 68, 70, 296, 312; 328/149; 382/50

[56] References Cited

U.S. PATENT DOCUMENTS

4,227,152  10/1980  Godard et al. ...................... 375/13

*Primary Examiner*—Benedict V. Safourek
*Attorney, Agent, or Firm*—Oblon, Spivak, McClelland, Maier & Neustadt

[57] ABSTRACT

A multi-level quadrature amplitude modulator system that can be used in communication channels in which there is intense fluctuation has a transmitter section that is provided with a frame synchronizer that inserts a reference symbol into each group of message symbols, and a receiving section that is provided with an estimator for the transmission path distortion in the message symbols on the basis of distortion found in the reference symbols. The receiving section is also provided with a compensator for the distortion thus described.

1 Claim, 9 Drawing Sheets

FIG.4(a) INPUT SIGNAL

FIG.4(b) OUTPUT SIGNAL

MULTI-LEVEL QUADRATURE AMPLITUDE MODULATOR SYSTEM WITH FADING COMPENSATION MEANS

BACKGROUND OF THE INVENTION

1. Field of the Invention

This invention relates to a multi-level quadrature amplitude modulator system provided with a fading compensation means that can be applied to channels in which radio transmission path characteristics are subject to rapid fluctuation.

2. Prior Art Statement

In digital radio channels, especially land mobile radio channels, fading produces variations in the phase and envelope of received waves. Conventionally, taking into consideration an envelope fluctuation of 20 dB or more, for such channels frequency and phase modulation systems have been used in which the envelope does not contain information.

However, for further improvement in the spectral efficiency it is necessary to use a multi-level quadrature amplitude modulator system in which the amplitude also contains information.

Multi-level quadrature amplitude modulator systems have been employed conventionally for transmission paths in which fluctuation is very slow, such as microwave channels. In such applications, automatic gain control has been used to compensate for envelope distortion along the transmission path and phase-locked loops have been used to compensate for phase fluctuation.

These methods have been effective in the case of fixed microwave channels in which transmission path fluctuation is slow and gentle. However, when this fluctuation is very rapid, such as in land mobile radio channels, there have been various problems, such as:

the inability of automatic gain control to provide full compensation when envelope fluctuation is rapid and intense;

at the parts of an envelope where distortion compensation is incomplete, appropriate threshold levels for data decision cannot be set; and because there is also intense phase fluctuation, a phase-locked loop cannot provide full compensation for phase distortion caused by fading.

Owing to such problems, when multi-level quadrature amplitude modulator systems are actually applied to land mobile radio channels, communication is possible only when a vehicle is stationary.

OBJECT AND SUMMARY OF THE INVENTION

The object of the present invention is to provide a multi-level quadrature amplitude modulator system that can be applied to communication channels in which there is intense transmission path fluctuation.

For attaining this object, the multi-level quadrature amplitude modulator system according to the present invention is comprised of a transmitter section having a serial-to-parallel converter, baseband signal generator, transmitting filter, quadrature modulator, amplifier and antenna that is provided with a frame symbol insertion section that inserts one known symbol per prescribed number of information symbols as a reference symbol; and a receiving section having an antenna, receiving filter, automatic gain control, coherent detector, clock regenerator and decoding section that is provided with:

a fading-distortion estimation section that estimates transmission path distortion in the information symbols from transmission path distortion that is detected on the basis of the inserted reference symbols;

and a fading-distortion compensation section which uses the transmission path distortion information, as estimated by the fading-distortion estimation section, to compensate for distortion in the received baseband signal and estimates the threshold level information required for data decision by the decoding section.

As described above, in the above transmission section one known symbol per prescribed number of information symbols is inserted to form a reference symbol in the data which is transmitted; and in the receiving section these inserted reference symbols are used to detect transmission path distortion, information symbol distortion is estimated based on the said detected transmission path distortion and distortion in the received baseband signal is compensated for.

The present invention thus enables multi-level quadrature amplitude modulator systems to be applied to land mobile radio communications, which previously has been considered difficult, and provides a major improvement in the spectral efficiency.

The above and other objects and features of the invention will become more apparent from the following detailed description with reference to the accompanying drawings

BRIEF DESCRIPTION OF THE DRAWINGS

FIGS. 8(a), 8(b), 8(c) and 8(d) show the shifting of

DETAILED DESCRIPTION OF THE PREFERRED EMBODIMENTS

An effective way of compensating for transmission path distortion in communication channels in which there is intense fluctuation is to proceed while estimating or measuring the fluctuation.

In accordance with the present invention, the transmission and receiving sections are provided with the following functions.

(a) To measure transmission path distortion, the transmission section transmits one known reference symbol per prescribed number of information symbols. That is, the signal points to be used for the reference symbol and after how many information symbols are transmitted is a reference symbol to be sent are decided prior to the transmission between the transmission and receiving sections.

Figure 1:
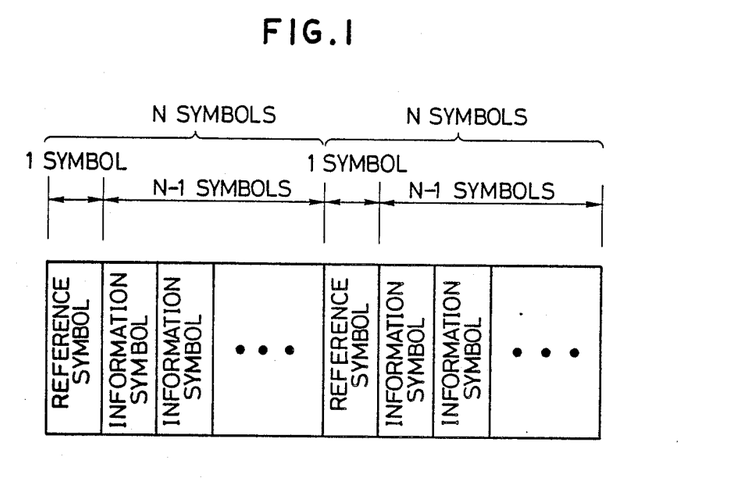
FIG. 1 is a frame format in which reference symbols have been inserted in the groups of information symbols.

FIG. 1 shows the frame format in which one reference symbol is inserted into each group of N−1 information symbols (N is a natural number). The closer the ratio between inserted reference symbols and information symbols, the more accurate the detection of transmission path distortion becomes. However, as it is necessary to increase the transmission rate by the amount of reference symbols to be transmitted, this increases the bandwidth that is required. As such, at a transmission rate of 16 ksymbol/sec, for example, a practical ratio would be one reference symbol per 10 to 20 information symbols. (16 ksymbol/sec means the transmission of 16,000 symbols each second.)

(b) In the receiving section, the reference symbols are detected and, as mentioned above, the reference symbol is a known signal, and is therefore used to measure transmission path distortion.

(c) Transmission path distortion in the transmitted information symbol groups is estimated on the basis of the transmission path distortion measured by means of the reference symbols.

(d) Received signal distortion compensation is performed based on the transmission path distortion estimated in (c).

(e) In addition, the transmission path distortion estimated in (c) is also used to calculate the requisite threshold values for determining which symbols have been sent.

(f) Based on the results of (d) and (e), the transmitted information symbols are estimated and the symbol signals are decoded to reproduce the transmitted data.

Figure 2:
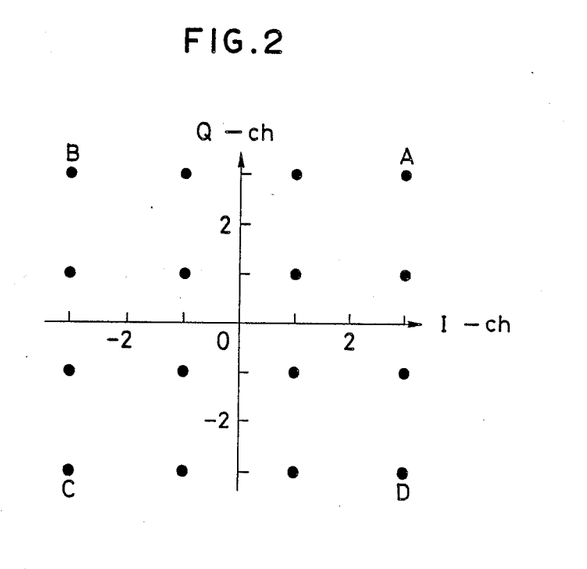
FIG. 2 is a 16 QAM signal state diagram.

FIG. 2 shows a 16QAM signal state diagram (showing complex baseband signalling points on a complex plane) as an example of a typical multi-level quadrature amplitude modulator system. As shown, in a 16 QAM system the signals are arranged at equal intervals in a complex plane. In M-value QAM each symbol can contain $K=\log_2(M)$ bits of information. Therefore, in the case of FIG. 2 each symbol contains four bits of information.

Figures 3, 4A, 4B:
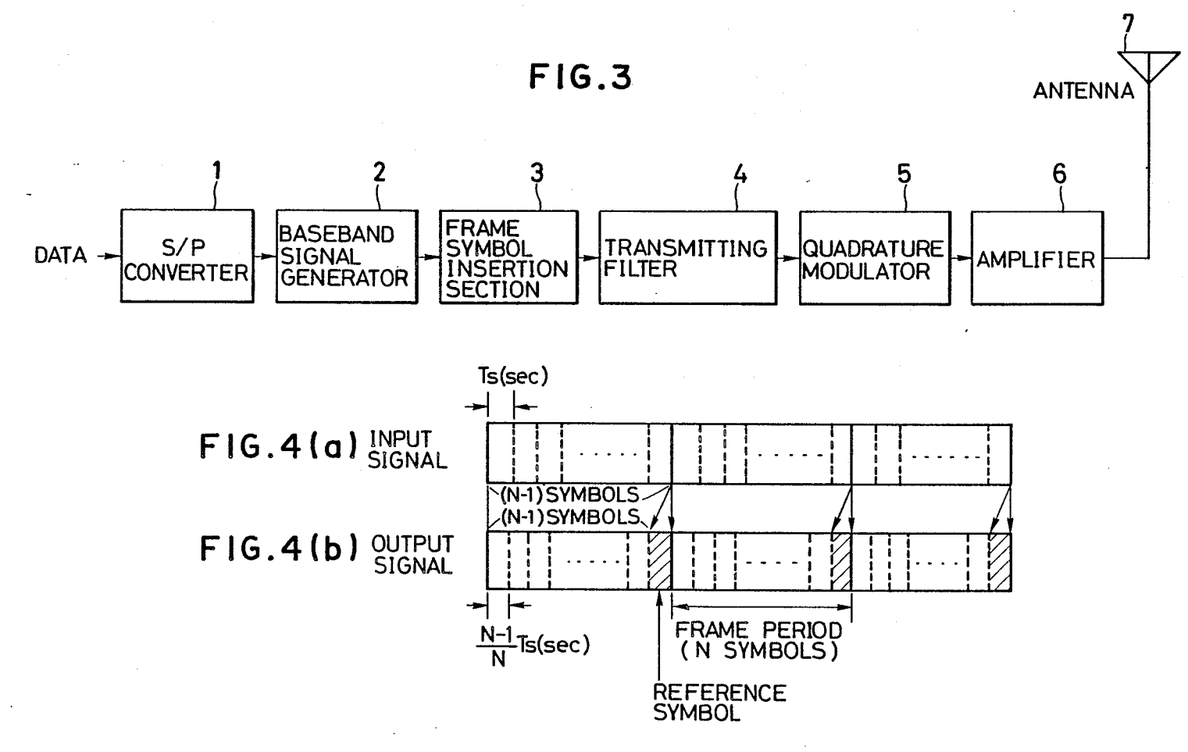
FIG. 3 is a block diagram of an embodiment of the transmission section in a multi-level quadrature amplitude modulator system according to the present invention.
FIG. 4(a) is an explanatory diagram showing the input data format of the frame symbol insertion section.
FIG. 4(b) is an explanatory diagram showing the output data format of the frame symbol insertion section.

FIG. 3 shows a preferred embodiment of the transmission section in a multi-level quadrature amplitude modulator system according to the present invention. The data to be transmitted is divided into K bit segments by a serial-to-parallel converter 1 and is then converted to corresponding complex baseband signals by a baseband signal generator 2. A serial-to-parallel converter and baseband signal generator employed in known multi-level quadrature amplitude modulator systems can be used without modification as the above serial-to-parallel converter 1 and baseband signal generator 2.

Next, a frame symbol insertion section 3 inserts one reference symbol per prescribed number of information symbols in order to measure transmission path distortion. The insertion of reference symbols into information symbol groups is performed by the frame symbol insertion section 3, as follows. In each frame cycle a prescribed number of information symbols of a duration $T_S$(sec) is output from the baseband signal generator 2, as shown in FIG. 4(a), so that in order to insert one reference symbol into each of the frame information symbol groups, as shown in FIG. 4(b), the duration of one symbol is reduced by $T_S \cdot (N-1)/N$, the said one reference symbol is inserted into each frame and the data is then output from the frame symbol insertion section 3. If the reference symbols are going to be used to measure transmission path distortion, it becomes necessary to raise the S/N ratio of the reference symbols in order to increase the accuracy of the estimation process. For the reference symbol, therefore, it is preferable to use points that give maximum amplitude (in FIG. 2, points A, B, C, D). The present embodiment will be explained using point A (3+j·3) for the reference symbol. The signals in which reference symbols have been inserted in the information symbol groups are band-limited by a transmitting filter 4, modulated by a quadrature modulator 5, power-amplified by an amplifier 6 and transmitted from an antenna 7.

A 16QAM transmitting signal x(t) that has undergone the above operations can be written as $$x(t) = a_I(t)\cos(\omega t) - a_Q(t)\sin(\omega t) \quad (1)$$

Where, $a_I(t)$ is the in-phase component of the transmission baseband signal, $a_Q(t)$ is the quadrature component, and $\omega$ is the transmission angular frequency. $a_I(t)$ and $a_Q(t)$ are the waveforms following band-limitation filtering by the transmitting filter 4.

Figure 5:
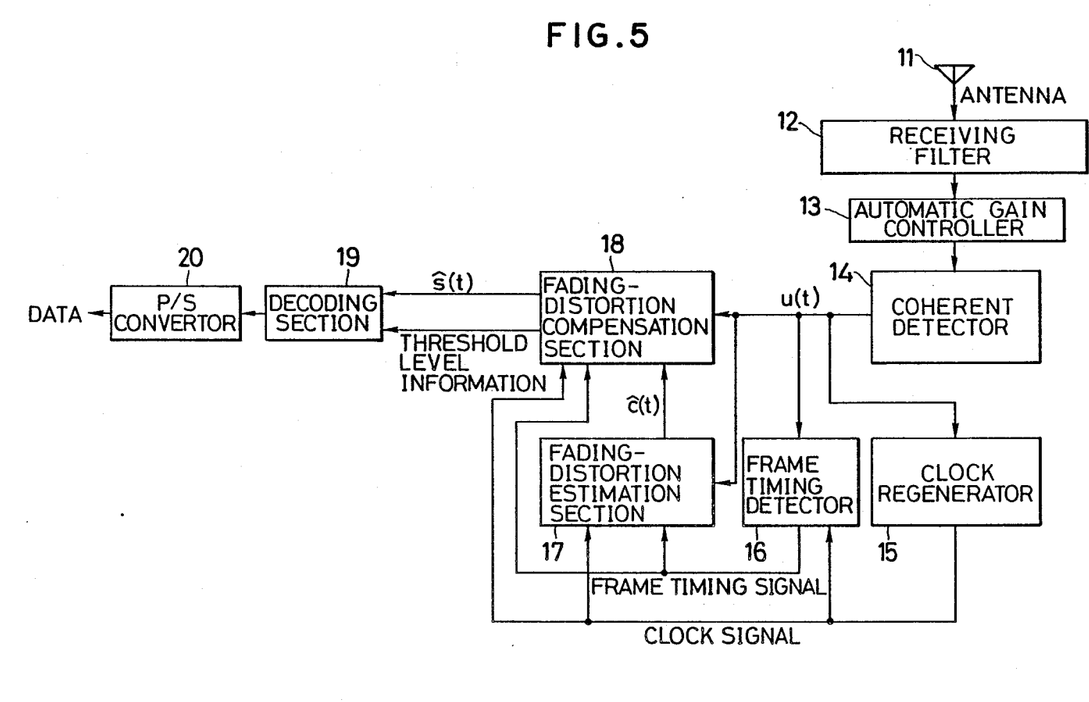
FIG. 5 is a block diagram of an embodiment of the receiving section in a multi-level quadrature amplitude modulator system according to the present invention.

With reference to FIG. 5 which shows an example of a configuration of the receiving section in the multi-level quadrature amplitude modulator system according to this invention, the 16QAM signal x(t) sent from the transmission section is received via an antenna 11, and after out-of-band noise has been removed by a receiving filter 12, it is amplified to an appropriate level by an automatic gain controller (AGC) 13. The signal y(t) thus amplified by the controller 13 is shown by $$y(t) = r(t)s_I(t)\cos(\omega t + \theta(t)) - r(t)s_Q(t)\sin(\omega t + \theta(t)) \quad (2)$$

in which r(t) is envelope fluctuation arising from the transmission path and $\theta(t)$ is phase fluctuation arising from the transmission path. $s_I(t)$ and $s_Q(t)$ are the baseband waveforms following band-pass filtering by the receiving filter 12.

Following this, the carrier wave is regenerated by a coherent detector 14 and is used for coherent detection to obtain a received complex baseband signal u(t). Only the center frequency of the received signal is regenerated in this carrier wave regeneration process; transmission path-induced phase fluctuation is not regenerated. Therefore, the received complex baseband signal u(t) becomes:

$$\begin{aligned} u(t) &= u_I(t) + j \cdot u_Q(t) \\ &= r(t)\exp(j \cdot \theta(t))(s_I(t) + j \cdot s_Q(t)) \\ &= c(t)(s_I(t) + j \cdot s_Q(t)) \end{aligned} \quad (3)$$

Where, c(t) is complex transmission path distortion $$c(t) = c_I(t) + j \cdot c_Q(t) \quad (4)$$
$$= r(t)\exp(j \cdot \theta(t))$$

Therefore, the received complex baseband signal u(t) will include transmission path distortion as well as transmitted symbols.

From this signal the clock is regenerated by a clock regenerator 15. The clock can instead be obtained from the envelope of the received wave.

The same receiving filter, AGC, coherent detector and clock regenerator that are employed in known multi-level quadrature amplitude modulator systems may be used for the receiving filter 12, AGC 13, coherent detector 14 and clock regenerator 15 described above.

Next, the reference symbol timing is detected from the complex baseband signal u(t) by a frame timing detector 16. In this embodiment, as a signalling point that has maximum amplitude is used for the reference symbols, the received complex baseband signal u(t) will periodically contain a maximum amplitude signals, which means that detection of the timing of these signals enables the timing of the reference signals to be obtained.

Figure 6:
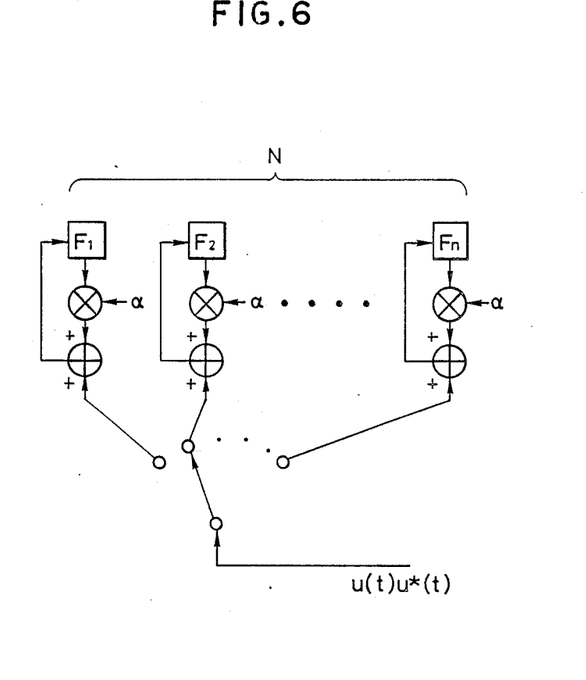
FIG. 6 is an explanatory diagram of a specific configuration of the frame timing detector of the receiving section.

The specific configuration for the frame timing detector 16 shown in FIG. 6 is provided with a number of memories $F_1, F_2, \ldots F_n$ that equals the number of frame length N, and $u(t)u^*(t)$, which is the power of the received complex baseband signal u(t) [$u^*(t)$ is the complex conjugate of u(t)] are incremented in these memories so that, for instance, in memory $F_1$, $t=kT_S$, in memory $F_2$, $t=(k+1)TS$; in memory $F_3$, $t=(k+2)T_S$, and in memory $F_n$, $t=(k+N-1)T_S$. The result of this process is that values written into memory during frame timing operations are always maximum values, so that the reference symbol spacing can be detected by detecting the said frame timing.

With repetition of the processing, however, overflow of each memory will happen.

One of the measures against this is to multiply a value of each memory by $\alpha (0 \leq \alpha < 1)$ before the increment as shown in FIG. 6. It is practical that $\alpha$ falls in the range of 0.9 to 0.99.

A fading-distortion estimation section 17 estimates transmission path distortion from the received baseband signals in the frame timing.

Figure 7:
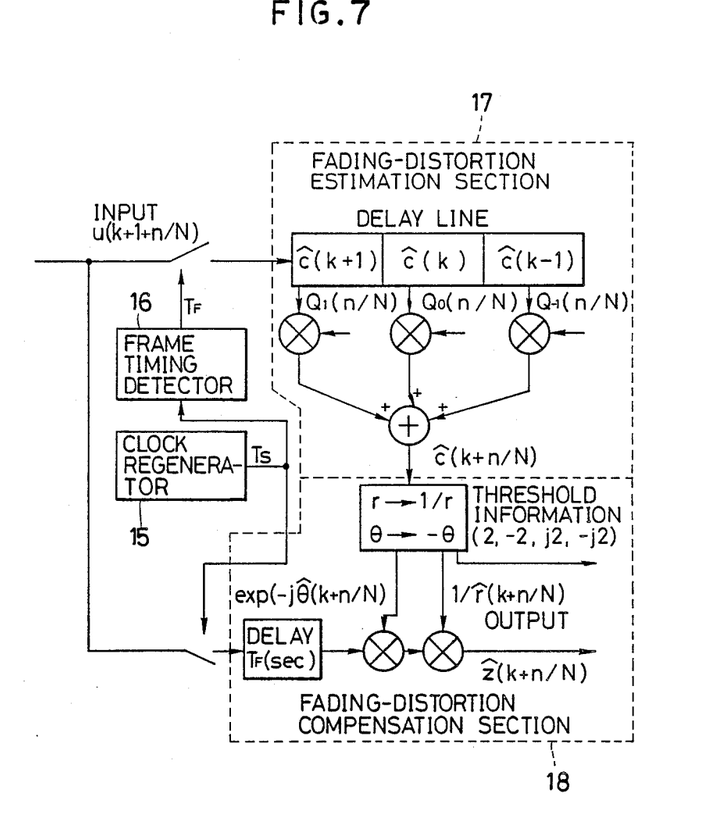
FIG. 7 is an explanatory diagram showing envelope and phase compensation by in the fading-distortion estimation section and fading-distortion compensation section of the receiving section.
Figure 8A:
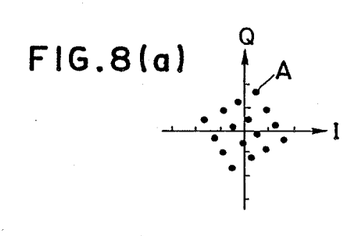
Figure 8B:
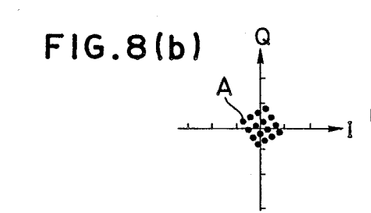
Figure 8C:
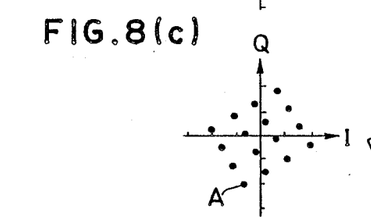
Figure 8D:
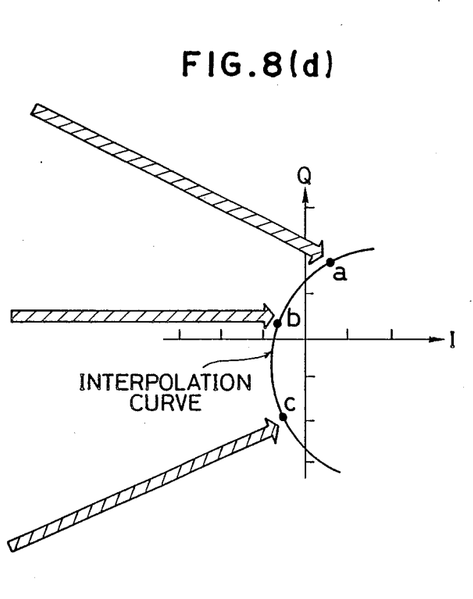

FIG. 7 shows a specific configuration of the fading-distortion estimation section 17 and a fading-distortion compensation section 18.

The frame length is assumed to be $$T_F = NT_S \quad (5)$$

The timing of each symbol is assumed to be $$t = kT_F + (m/N)T_F \quad (6)$$

(k=0, 1, 2, ..., m=0, 1, 2, ... N−1) and the reference symbol timing is assumed to be $$t = kT_F \quad (7)$$

(k=0, 1, 2, ...) which corresponds to m=0 in eq. (6).

Next, the received complex baseband signal of the reference symbols is measured. Equation (8) shows the received complex baseband signal u(k) of a reference symbol at $t=kT_F$.

$$u(k) = c(k)(3+j \cdot 3) \quad (8)$$

If for example the positions (point A) of reference symbols at $t=kT_F$, $(k+1)T_F$, $(k+2)T_F$ should shift as shown by (a), (b) and (c) in FIG. 8, the locus of these reference symbol A points will become as shown by (d) in FIG. 8, and the complex transmission path distortion $\hat{c}(k)$ at $t=kT_F$ therefore will be:

$$\hat{c}(k) = u(k)/(3+j \cdot 3) \quad (9)$$

The estimated distortion value $\hat{c}(t)$ will correspond to transmission path distortion c(t) sampled at frame cycle $T_F$. Also, complex transmission path distortion c(t) fluctuation being a band-limited random process, as can be understood from FIG. 8(a), the position (point A) of the reference symbol will show a slow fluctuation, so that by therefore setting the frame cycle $T_F$ so that it does not exceed the Nyquist interval of the transmission path c(k) and employing interpolation, an estimated value for fading distortion in the information symbols can be obtained.

Interpolation methods include Newton's Method and Gauss' equation. In this example, a second order Gauss' equation is employed.

If estimated fading distortion values attained at $t=(k-1)T_F$, $kT_F$, $(k+1)T_F$ are assumed to be $\hat{c}(k-1)$, $\hat{c}(k)$, $\hat{c}(k+1)$, fading fluctuation $\hat{c}(k+m/N)$ at a time $t = kT_F + (m/N)T_F$ can be estimated as:

$$\hat{c}\left(k + \frac{m}{N}\right) = \frac{1}{2}\left\{\left(\frac{m}{N}\right)^2 - \frac{m}{N}\right\}\hat{c}(k-1) + \quad (10\text{-}1)$$

$$\left\{1 - \left(\frac{m}{N}\right)^2\right\}\hat{c}(k) + \frac{1}{2}\left\{\left(\frac{m}{N}\right)^2 + \frac{m}{N}\right\}\hat{c}(k+1) =$$

$$Q_{-1}\left(\frac{m}{N}\right)\hat{c}(k-1) + Q_0\left(\frac{m}{N}\right)\hat{c}(k) + Q_1\left(\frac{m}{N}\right)\hat{c}(k+1)$$

Where, $$Q_{-1}\left(\frac{m}{N}\right) = \frac{1}{2}\left\{\left(\frac{m}{N}\right)^2 - \frac{m}{N}\right\} \quad (10\text{-}2)$$

$$Q_0\left(\frac{m}{N}\right) = 1 - \left(\frac{m}{N}\right)^2 \quad (10\text{-}3)$$

$$Q_1\left(\frac{m}{N}\right) = \frac{1}{2} - \left\{\left(\frac{m}{N}\right)^2 + \frac{m}{N}\right\} \quad (10\text{-}4)$$

This processing is performed by the fading-distortion estimation section 17 shown in FIG. 7.

When transmission path fluctuation is considerably slower than the symbol rate, interpolation can be carried out after smoothing the reference symbols to raise the S/N ratio.

The estimated value $\hat{c}(t)$ of transmission path distortion thus obtained is then transferred to the fading-distortion compensation section 18 and is used to compensate for transmission path distortion in the received complex baseband signal u(t).

There are two methods of compensating for transmission path distortion in the received complex baseband signal u(t). In one method, when $$\hat{c}(t) = \hat{r}(t)\exp(j \cdot \hat{\theta}(t)) \tag{11}$$

by calculating $$\hat{s}(t) = u(t)\exp(-j \cdot \hat{\theta}(t))/\hat{r}(t) \tag{12}$$

in the fading-distortion compensation section 18, both envelope compensation and phase compensation are performed and data decision threshold values are set at 0, ±2, ±j·2. This threshold value information can be used by the decoding section 19. The operations described above are carried out by the fading-distortion compensation section 18 shown in FIG. 7. Where, $\hat{c}(k+n/N)$ is calculated after $\hat{c}(k+1)$ been input. With reference to FIG. 7, for example, interpolation between b and c is started after measuring $\hat{c}(t)$ from point a to point c. Therefore, in the fading distortion compensation section 18, the complex baseband signal u(t) is delayed by just $\tau F$(sec) and $\hat{c}(k+n/N)$ is used for the compensation of $u(k+n/N)$.

In the other method, only phase compensation is performed based on the calculation by the fading-distortion compensation section 18 of $$\hat{s}(t) = u(t)\exp(-j \cdot \hat{\theta}(t)) \tag{13}$$

and the data determination threshold values are set at 0, ±2$\hat{r}$(t), ±j·2$\hat{r}$(t).

Figure 9:
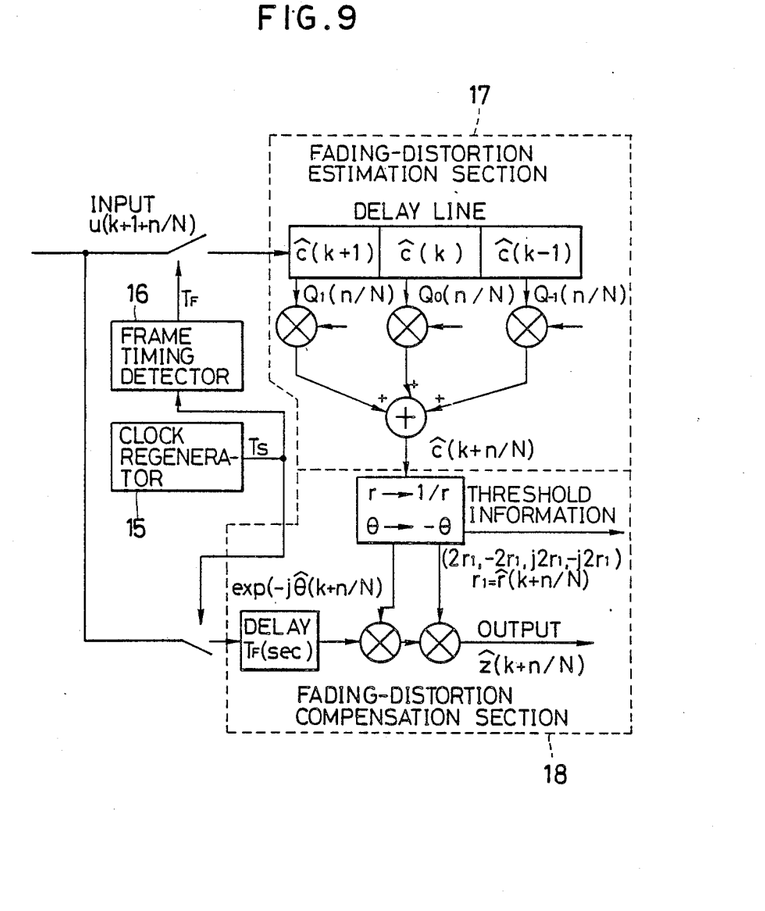
FIG. 9 is an explanatory diagram showing phase compensation in the fading-distortion estimation section.

FIG. 9 shows a specific configuration for the fading-distortion estimation section 17 and fading-distortion compensation section 18 for performing the above operations.

Next, the baseband signal $\hat{s}(t)$ which has been transmission-path-distortion compensated and the threshold value information are transferred to the decoding section 19 and the transmitted symbols are regenerated to reproduce the k-bit information contained in the symbols. This information is then converted to serial form by a parallel-to-serial converter 20 and output as regenerated data.

The present invention thus enables multi-level quadrature amplitude modulator systems to be applied to land mobile radio communications, which previously has been considered difficult, and provides a considerable improvement in the spectral efficiency.

Because of the use by the present invention of frame symbol insertion to measure transmission path distortion, compared to the prior systems the following can be a problem.

(1) Reduction of the power allocated to information symbols (2) Multiplication of the transmission band by (N+1)/N.

In the past, differential encoding has been used to compensate for the phase ambiguity in regenerated carrier. Because the present invention uses frame symbols, however, the absolute phase of each symbol can be detected and differential encoding becomes needless. The bit error rate therefore can be reduced, compared with conventional systems. As the degree of this improvement is greater than the reduction in the electrical power allocated to information symbols, the first of the above problems does not arise.

As in addition the degree of improvement in the spectral efficiency produced by the use of multi-level quadrature amplitude modulation is considerably greater than the degree of the decrease in the spectral efficiency caused by the insertion of frame symbols, the second of the above problems is also eliminated. It follows, therefore, that multi-level quadrature amplitude modulator systems can be applied to communication channels in which there is intense transmission path fluctuation.

With further reference to the embodiment of this invention, using a transmitter with the configuration shown in FIG. 3 and a receiver with the configuration shown in FIG. 4, and roll-off filters with a roll-off factor $\alpha = \sqrt{50\%}$ as the transmission and receiving filters, 16QAM, 64QAM and 256QAM information was transmitted and the bit error rate performance vs. $E_b/N_o$ was obtained by computer simulation. A maximum Doppler frequency $f_d$ of 40 Hz and a symbol rate of 16 ksymbol/sec were set. ($f_d$ indicates c(t)'s maximum spectral frequency.)

Figure 10:
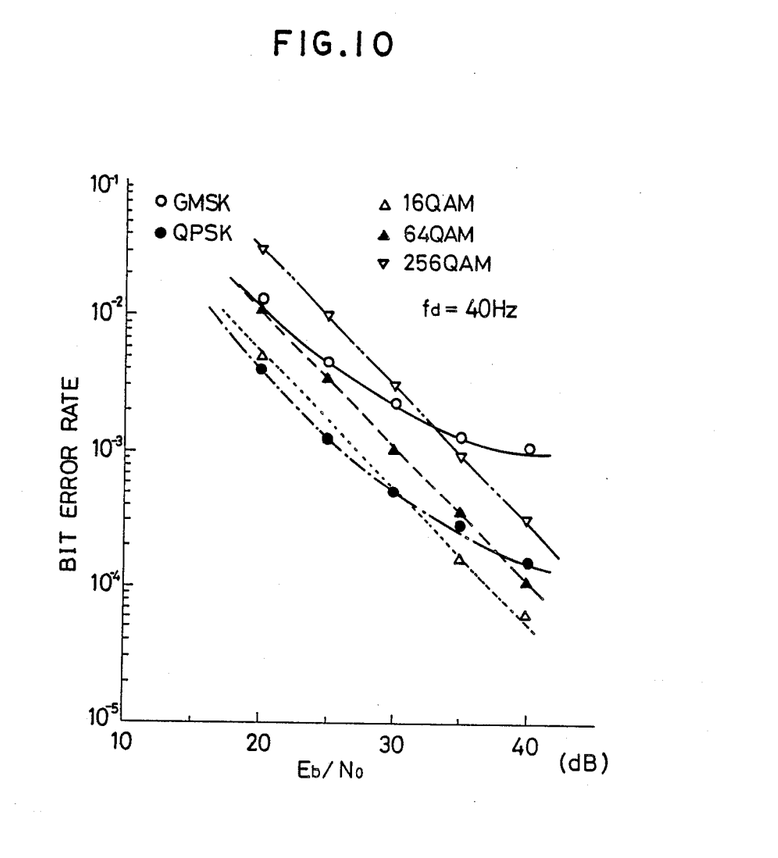
FIG. 10 is a simulated result of bit error rate performance vs. $E_b/N_o$ for each modulation system.

The results are as shown in FIG. 10. For reference, curves have been included showing the best current GMSK and QPSK characteristics for land mobile radio communication, as reported in papers and the like.

As can be seen, the bit error rates for 16 QAM and 64QAM according to the present invention are lower than the bit error rate obtained with GMSK. This means that use in communication systems of the 16 QAM and 64 QAM according to this invention can provide communication channels of substantially the same quality as the conventional GMSK system while using a narrower bandwidth than that of the GMSK system (one-quarter the bandwidth in the case of 16QAM and one-sixth in the case of 64QAM) and less transmission power, thereby providing a major contribution to communication systems.

Next, the 16QAM modem with this invention was implemented, where, digital signal processors were used to configure the serial-to-parallel converter, baseband signal generator and frame symbol insertion section of the transmitter of FIG. 3 and the frame timing detector, transmission path distortion estimation section, transmission path distortion compensation section, decoder, and parallel-to-serial converter of the receiver shown in FIG. 5, and a D/A converter was provided in the latter stage of the transmitter's frame symbol insertion section and an A/D converter in the latter stage of the receiver's coherent detector. In addition, the transmitter and receiver were provided with Gaussian filters with a 3 dB bandwidth of 24 kHz.

Figure 11:
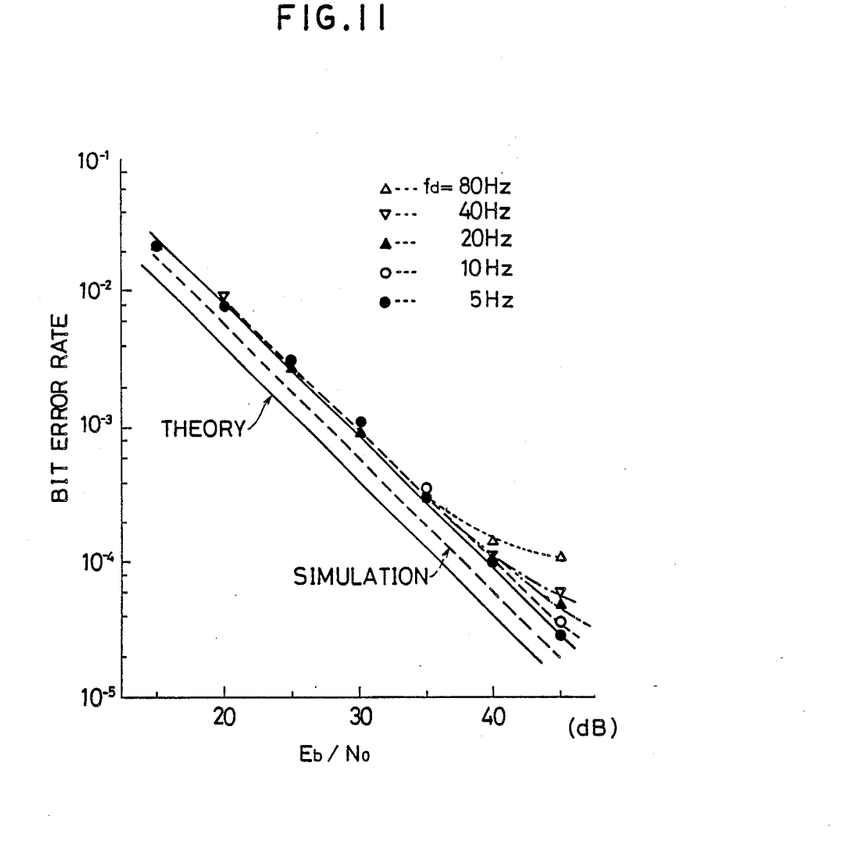
FIG. 11 is a laboratory experimental result of bit error rate performance vs. $E_b/N_o$ in the case of the apparatus of this invention.

The bit error rate performance vs. $E_b/N_o$ obtained using the said transmitter and receiver thus configured was then measured. The results are shown in FIG. 11. As can be seen, the characteristics are degraded by about 1.5 dB compared with the simulation results, because Gaussian filters were used in the transmitter and receiver instead of roll-off filters. Other than that, the characteristics are approximately the same as the simulation results, showing that the present invention is fully reliable and can be practically utilized.

What is claimed is:

1. A multi-level quadrature amplitude modulator system comprising:

a transmitter section having a serial-to-parallel converter, baseband signal generator, transmitting filter, quadrature modulator, amplifier and antenna that is provided with: a frame symbol insertion section that inserts one known symbol per prescribed number of information symbols as a reference symbol; and a receiving section having an antenna, receiving filter, automatic gain control, coherent detector, clock regenerator and decoding section that is provided with: a fading-distortion estimation section that estimates transmission path distortion in the information symbols from transmission path distortion that is detected on the basis of the inserted reference symbols; and a fading-distortion compensation section which uses the transmission path distortion information, as estimated by the fading-distortion estimation section, to compensate for distortion in the received baseband signal and estimates the threshold value information required for data determination by the decoding section.

* * * * *